United States Patent [19]

McKenzie

[11] Patent Number: 4,849,647

[45] Date of Patent: Jul. 18, 1989

[54] FLOATING WATER TURBINE

[76] Inventor: T. Curtis McKenzie, 710 W. 13th St., Laurel, Mont. 59044

[21] Appl. No.: 119,394

[22] Filed: Nov. 10, 1987

[51] Int. Cl.⁴ ............................................. F03B 3/04
[52] U.S. Cl. ...................................... 290/54; 416/84; 417/334
[58] Field of Search ............... 290/43, 54; 415/7, 71, 415/72; 416/84, 85, 176; 417/334, 337

[56] References Cited

U.S. PATENT DOCUMENTS

| 868,798 | 10/1907 | McLaughlin | 290/54 |
| 1,830,985 | 11/1931 | Dreier | 416/84 |
| 3,233,574 | 2/1966 | Justinien | 416/84 |
| 4,151,424 | 4/1979 | Bailey | 290/54 |
| 4,412,417 | 11/1983 | Dementhon | 416/84 X |
| 4,717,832 | 1/1988 | Harris | 290/54 X |

Primary Examiner—William M. Shoop, Jr.
Assistant Examiner—W. E. Duncanson, Jr.
Attorney, Agent, or Firm—John B. Dickman, III

[57] ABSTRACT

A floating water turbine for taking the kinetic energy from linear current flow and converting it into mechanical energy and subsequently into electrical energy. The turbine is constructed of a buoyant material to support itself on top of the water, thereby eliminating any drag from the apparatus.

4 Claims, 2 Drawing Sheets

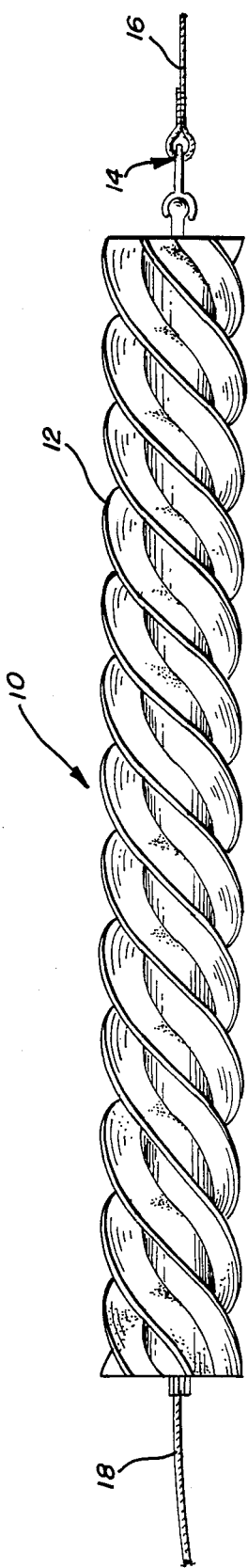
FIG. 1
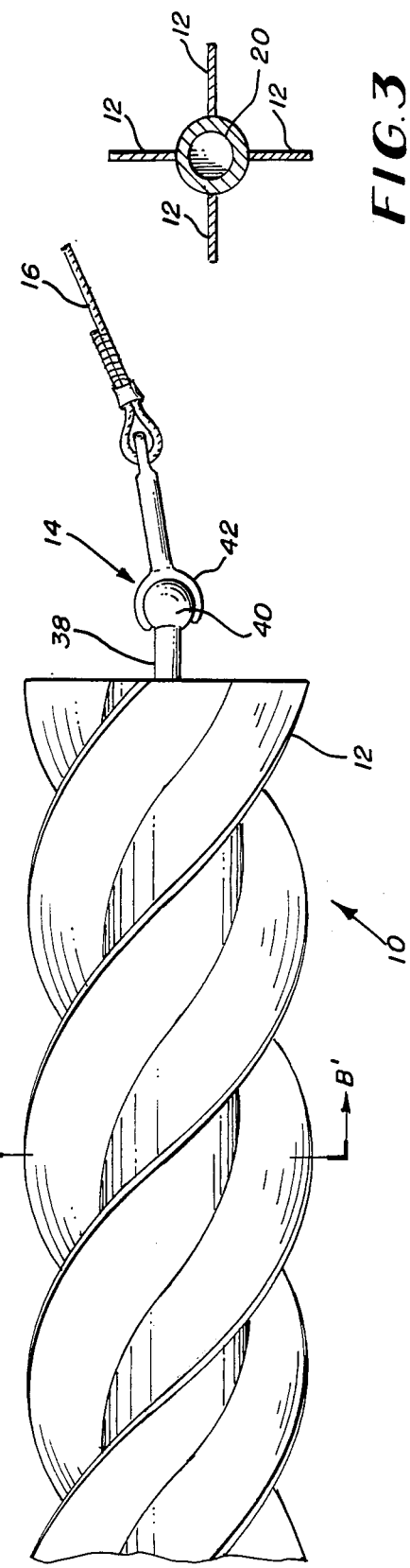
FIG. 3
FIG. 2

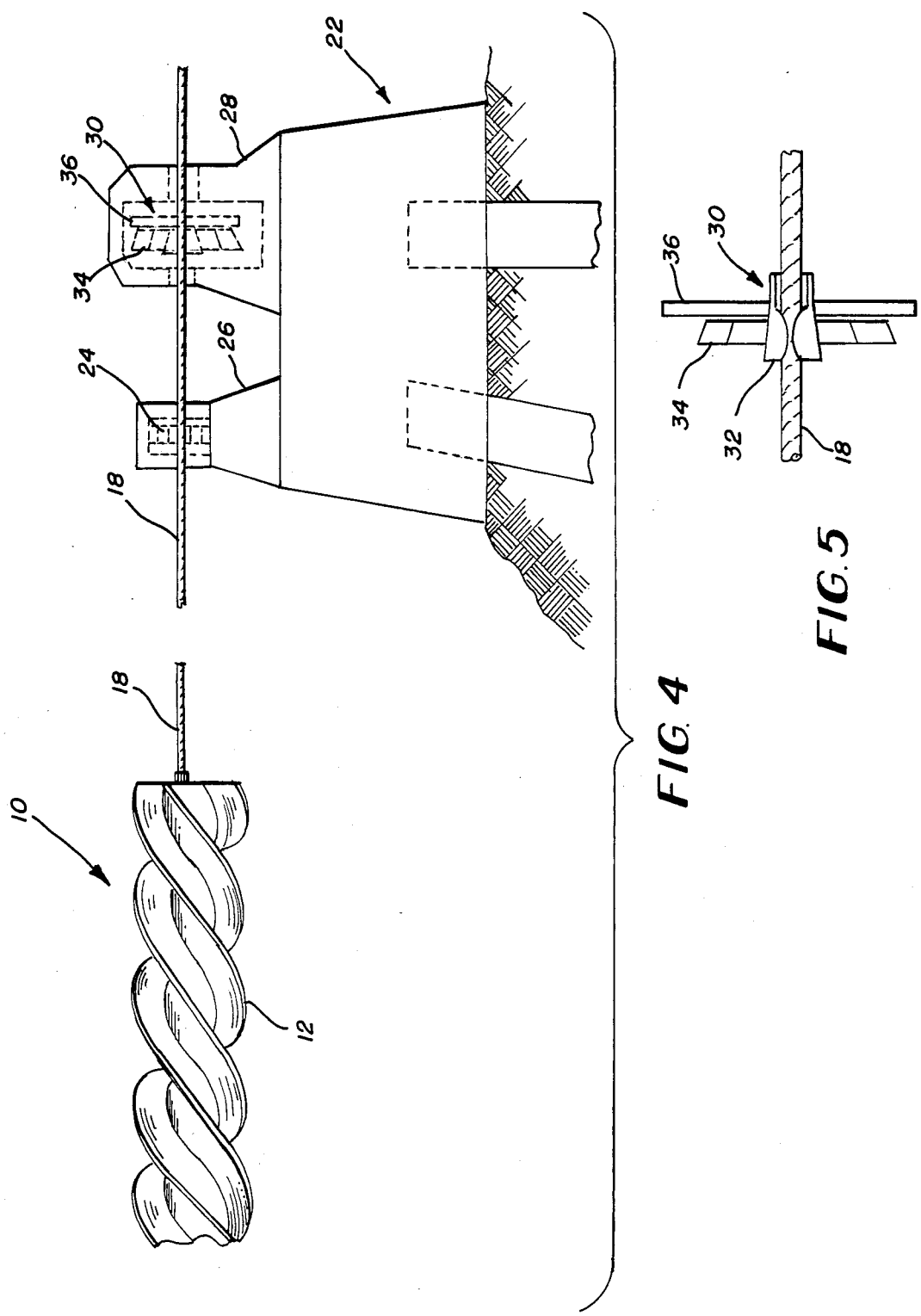

FLOATING WATER TURBINE

BACKGROUND OF THE INVENTION

The field of the invention is a turbine for converting the natural energy of wave motion and flowing river and streams into mechanical rotating energy, and subsequently coverting the mechanical energy into electrical energy. The thrust of the present invention relates to the turbine. The known technology of wave motion turbines includes a floating rotary turbine which is tethered such that the turbine vanes are rotated by the waves or flowing streams. Mechanical energy from the turbine is used to rotate electrical generators.

The inventor is aware of the following U.S. Patents directed to floating water turbines:

U.S. Pat. No. 565,022, issued to Newburg
U.S. Pat. No. 669,852, issued to Peterson
U.S. Pat. No. 672,085, issued to Tingley
U.S. Pat. No. 868,798, issued to McLaughlin
U.S. Pat. No. 1,782,227, issued to Smith
U.S. Pat. No. 4,412,417, issued to Dementhou The Newburg U.S. Pat. No. 565,022, shows a hydraulic motor with a spiraled blade attached to a rotating shaft in a floating vessel. The shaft is supported at each end and in the middle by bearings. The bottom half of the spiraled blade is in a channel that is fitted to the shape of the blade. The blade is not buoyant and therefore depends for its buoyancy support on the sealed chambers of the vessel.

The generating power of the motor is restricted by the close fitting channel of the spiraled blade. The only force of rotation applied to the lower half of the spiraled blade is at the head end, thus inhibiting the capacity of the motor.

In Peterson, U.S. Pat. No. 669,852, a water current wheel with fan-like blades is disclosed. The length of the blades is about half the diameter of the wheel, which is a very low working area for power generation.

A wave motor is disclosed in the Tingley patent, U.S. Pat. No. 672,085. This is a fairly complicated machine that is designed for ocean or a large body of water use, not small rivers or streams. There are clutches between each compartment section. These clutches will only engage when the sum of the positive forces acting on the screw are exceeded by the negative forces acting on the same section of the screw. Because the lower portion of the screws are at all times partially immersed in the lower half of a wave, sometimes totally immersed, there will be negative forces acting on all of the screw sections. In otherwords, the water in the lower half of a wave will be moving in an opposite direction form the top half of the wave. While it appears that it is intended to take power from the top half only, part of the power is lost to the negative forces in the lower half of the wave.

The McLaughlin patent, U.S. Pat. No. 868,798, is directed to a power turbine and generator where a spiral blade on a shaft is connected to a generator in a sealed vessel. The spiral blade is located behind the vessel such that water flows past the vessel before contacting the blade. The effectiveness of the rotating spiral blade is reduced by the shielding of the vessel.

The Smith patent, U.S. Pat. 782,227, a water power apparatus is disclosed, where a paddel wheel is rotatably mounted on pontoons. Based on the generation capacity of the apparatus on a stream velocity of 6 feet per second, the generator will produce about 10 KV/H, which is impractical for the cost of the apparatus.

The most recent patent to Dementhou, U.S. Pat. No. 4,412,417, shows a rotational buoyant mass comprising at least one pair of helical volumes that is supposed to rotate about a common axis. If it does rotate, it will be very sporadic and unpredictable. Since any energy in the lower half of the wave height negates most or all of the energy of the top half of the wave any power developed would be very small.

The main reason for failure in most of the prior art wave motors is the failure of the inventors to realize that there is as much water flow in a reverse direction as there is in the apparent foreward direction. Thus any energy utilizing device that is operated in the lower half of the wave height is in difficulty if the device is intended to develop usable power.

The main object of this invention is to provide a turbine which eliminates the problem of the prior wave turbines.

SUMMARY OF THE INVENTION

The present invention relates to a wave turbine, and more particularly to a wave turbine of buoyant material to support the turbine on the surface of the water.

The floating water turbine consists of a cylinder with attached helical blades floating in a flowing river or stream. The up stream end, or front end, is anchored to a relatively fixed location, such as a point on a stream bank, an isolated moorage pier or an anchored barge. The power derived from the floating turbine is either from the lower end by a flexable drive or from the front end by a flexable drive cable that can either run thru the center of a hollow ball jointed mooring connection or the flexable drive can be a rotating anchoring cable that is secured to the anchorage: either way the floating water turbine is held in a stable longitudinal location in the flowing stream.

The floating characteristic of the turbine is provided by either making the turbine and helical blades of wood or other buoyant material, in this case the core cylinder will only be large enough to provide strength to the turbine; or being made of a nonbuoyant material, in this case the core cylinder will be closed on the ends and be large enough to provide buoyancy to support the whole turbine on the surface of the water, to this cylinder the helical blades are attached.

The force of the flowing water will cause the floating turbine to rotate. The turbine removes the kinetic energy of flowing water and converts this linear force to rotational force which can be used for mechanical drive or for generating electrical energy.

It is an object of the invention to provide a floating turbine having a buoyance to float on the surface of the water.

A further object of the invention is to provide a floating turbine that can be operated in the ocean or river or stream.

Still a further object is to provide an inexpensive floating turbine that has low cost operation.

These and other objects will be realized from the drawings and specification.

BRIEF DESCRIPTION OF THE DRAWINGS

FIG. 1 is a side elevation view of a floating turbine of the invention;

FIG. 2 is a partial side elevation view of a floating turbine, showing a cable connection of the invention;

FIG. 3 is a cross sectional view of a floating turbine taken along the line B-B' of FIG. 2;

FIG. 4 is a side elevation of a floating turbine and anchorage system of the present invention;

FIG. 5 is a cross section of a load carrier bearing of the present invention.

DESCRIPTION OF THE INVENTION

Referring to the drawings, there is shown in FIG. 1 a floating turbine 10 with helical blades 12. One end of the turbine 10 has a swivel connector 14 connected to a tether line 16. The tether line 16 is connected to a mooring either on the shore or on a barge. The other end of the floating turbine 10 has a flexible drive shaft 18 which leads to a generator, not shown. The drive shaft 18 is fixed to the end of the floating turbine 10 such that any rotation of the turbine will translate to rotation of the drive shaft 18.

The floating turbine 10 is constructed of a buoyant material like wood, or some other buoyant material. FIG. 3 shows a cross section through the turbine 10, showing four helical blades 12 and a hollow core 20 sealed at both ends. The blades 12 may be made of a non-buoyant material, in which case the core must be sealed and filled with air.

Floating in a moving river or stream, the turbine rides on top of the water, where the current affects the rotation of the turbine. FIG. 4 shows the drive line 18 leading from the turbine 10 to an anchorage pier 22. The drive line extends through a carrier bearing 24, supported in a bearing housing 26. a second bearing housing 28 supports a load carrying bearing 30, which is best shown in FIG. 5. The drive line 18 is gripped by a segmented wedge element 32 forced against the drive line 18 by the interaction of a thrust bearing 34 and a rotating disk 36. The entire load carrying bearing 30 rotates and is encased in the load carrying bearing housing 28, and the load carrying bearing housing is an integral part of the anchorage place ( pier, anchorage barge or bank shore location) and absorbs the transmitted longitudional thrust due to the force of the stream acting on the floating water turbine. Also the carrier bearing allows the drive line 18 to freely rotate on its plurality of bearings, not shown A clear view of the ball joint connector 14 is shown in FIG. 2 where a fixed shaft 38 extends from the turbine 10. On the end of shaft 38 is a ball shape 40 which is captured by a ball joint 42. Flexible tether line 16 is connected to the ball joint. This arrangement permits the turbine 10 to rotate with in the ball Joint 40.

The floating water turbine 10 FIGS. 1 and 2 with its helical blades 12 floats in a flowing stream. The front (up stream end) is anchored by a tether line 16 to a relatively fixed location, such as a point on stream bank, an isolated moorage pier or an anchored barge. The power derived from the turbine 10 is from either the turbine lower end by a flexible drive line 18 that runs thru the center of a hollow mooring connection to the up stream tether line 16, FIGS. 4 and 5 or by a rotating anchored tether line 18 that also supplies power for use. In this case a load carrying bearing 34 restrains the longitudinal force of the flowing water that is exerted on the floating and rotating turbine 10. This bearing 34 and its rotating disc 36 are secured in load carrying bearing housing 28. The tapered interlocking wedges 32 form the base adapter sleeve secured to the flexible drive line 18 by pressure on the arc shaped inner portions of the wedges. The wedges 32 have a spline on the upstream end of each section and are secured to the rotating disc 36 with an adjustable nut on the threaded end of each spline. The force on the tapered (load carrying) bearing by the rotating disc 36 causes arc shaped interiors of the segmented base adapter sleeve to press into and securely hold the drive line 18.

Since the floating characteristics of the turbine 10 are provided by making the helical blades 12 of a bouyant material, in which case the core 20 will only be large enough to provide strength to the turbine. Should the blades 12 be made of a non bouyant material, the core 20 will be larger and sealed at both ends.

The strands of the flexible drive line 18 are coated with a synthetic rubber or plastic to reduce wear.

It should be understood that while only one embodiment of the invention has been shown, one skilled in the art may realize other embodiments; therefore, one should look to the drawings and specification for a full understanding of the invention.

I claim:

1. A floating water turbine for utilizing the natural forces of flowing water to convert the wave energy to mechanical energy, which can be subsequently converted to usable electrical energy, comprising:
    a hollow core means capable of being buoyant to support said turbine on the surface of water;
    a plurality of helical blade means fixed to said core to be acted upon by linear water currents;
    a tether line means for anchoring said turbine, where said line means is swivelly connected at one end of said core;
    a drive line means fixed at the other end of said turbine, whereby any rotating motion imported by wave action to said turbine is transmitted through said drive line means to an on shore generator.

2. A floating water turbine as in claim 1 wherein said blade means are of a buoyant material 3. A floating water turbine as in claim 2 wherein said blade means are wood.

4. A floating water turbine as in claim 1 wherein said blade means are of a nonbuoyant material.

* * * * *